(12) United States Patent
Shih et al.

(10) Patent No.: US 9,659,302 B2
(45) Date of Patent: May 23, 2017

(54) RECOMMENDATION SYSTEM, METHOD AND NON-TRANSITORY COMPUTER READABLE STORAGE MEDIUM FOR STORING THEREOF

(71) Applicant: Institute for Information Industry, Taipei (TW)

(72) Inventors: Meng-Jung Shih, Taoyuan County (TW); Ping-I Chen, Taipei (TW); Tai-Chun Wang, New Taipei (TW); Zon-Yin Shae, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 578 days.

(21) Appl. No.: 14/088,534

(22) Filed: Nov. 25, 2013

(65) Prior Publication Data

US 2015/0106374 A1    Apr. 16, 2015

(30) Foreign Application Priority Data

Oct. 15, 2013    (TW) .............................. 102137173 A

(51) Int. Cl.
*G06F 17/30* (2006.01)
*G06Q 30/02* (2012.01)

(52) U.S. Cl.
CPC .................................. *G06Q 30/02* (2013.01)

(58) Field of Classification Search
USPC ......................................... 707/737, 738, 739
See application file for complete search history.

(56) References Cited

U.S. PATENT DOCUMENTS 8,266,082 B2    9/2012 Lu et al.
2004/0015415 A1*    1/2004 Cofino ................. G06Q 10/063
                                                                  705/7.11

(Continued)

FOREIGN PATENT DOCUMENTS

CN    102792299 A    11/2012
CN    103198418 A    7/2013

OTHER PUBLICATIONS

Suyun Wei et al., "Collaborative Filtering Recommendation Algorithm Based on Item Clustering and Global Similarity" 2012 Fifth International Conference on Business Intelligence and Financial Engineering.

(Continued)

*Primary Examiner* — Mohammad S Rostami
*Assistant Examiner* — Ahmed Abraham
(74) *Attorney, Agent, or Firm* — McClure, Qualey & Rodack, LLP

(57) ABSTRACT

A recommendation method includes providing an ontology database, in which the ontology database includes a plurality of entities, and the entities are arranged in an ontology hierarchy structure with N hierarchy levels; storing a plurality of $j^{th}$ level user data respectively corresponding to a plurality of users; generating a plurality of $k^{th}$ level user data according to the $j^{th}$ level user data respectively; clustering the $k^{th}$ level user data; and recommending the entities in the ontology database to the users according to a clustering result.

16 Claims, 7 Drawing Sheets

(56) References Cited

U.S. PATENT DOCUMENTS

| | | | |
|---|---|---|---|
| 2011/0173144 A1 | 7/2011 | Shan et al. | |
| 2011/0225197 A1* | 9/2011 | Howes | G06F 17/30011 |
| | | | 707/780 |
| 2012/0011141 A1* | 1/2012 | Park | G06F 17/3043 |
| | | | 707/769 |
| 2012/0158633 A1* | 6/2012 | Eder | G06F 19/3437 |
| | | | 706/46 |
| 2013/0046723 A1* | 2/2013 | Sweeney | G06N 5/02 |
| | | | 706/47 |
| 2013/0132442 A1* | 5/2013 | Tsatsou | G06F 17/30734 |
| | | | 707/798 |

OTHER PUBLICATIONS

SongJie Gong, "A Collaborative Filtering Recommendation Algorithm Based on User Clustering and Item Clustering" Journal of Software, vol. 5, No. 7, Jul. 2010.

English translation of abstract of CN 102792299 A (published Nov. 21, 2012).

Examination Report for corresponding Taiwan Application No. TW 102137173 dated Apr. 9, 2015.

Ya-Ju Liu, Using Ontology and Group Preference Tree for Product Recommendation, Jan. 14, 2009.

English abstract of Ya-Ju Liu, Using Ontology and Group Preference Tree for Product Recommendation, Jan. 14, 2009.

\* cited by examiner

RECOMMENDATION SYSTEM, METHOD AND NON-TRANSITORY COMPUTER READABLE STORAGE MEDIUM FOR STORING THEREOF

RELATED APPLICATIONS

This application claims priority to Taiwan Application Serial Number 102137173, filed Oct. 15, 2013, which is herein incorporated by reference.

BACKGROUND

Technical Field

The present disclosure relates to a recommendation technology and, more particularly, to a clustering-based recommendation system and method.

Description of Related Art

With advances in information technology, recommendation systems of providing information of interest (e.g., product information) for users are widely used in various kinds of electronic medias.

A typical recommendation system is operated with collecting user data, clustering the collected user data, and providing information (e.g., product information) to a user according to a cluster which the user belongs to. Through such operation, the recommendation system can cluster the user with other users having similar purchase behaviors, and recommend product information to the user according to the purchase behaviors of the other users in the same cluster.

However, in practice, due to the sparsity of the user data (e.g., that most of the users purchase only a few part of products in total products), the recommendation system may incorrectly cluster the users and result of inaccuracy of recommendation. As a result, such a problem should be solved.

SUMMARY

One aspect of the present invention is directed to a recommendation method. In accordance with one embodiment of the present invention, the recommendation method includes, providing an ontology database, in which the ontology database comprises a plurality of entities, the entities are arranged in an ontology hierarchy structure with N hierarchy levels $\{L\_i\}$, $i=1, 2, \ldots, N$, and N is an integer; storing, through the ontology database, a plurality of $j^{th}$ user data respectively corresponding to a plurality of users, in which each of the $j^{th}$ user data records at least one $j^{th}$ entity of the entities on the $j^{th}$ hierarchy level $L\_j$; generating a plurality of $k^{th}$ user data corresponding to the users according to the $j^{th}$ user data respectively, in which each of the $k^{th}$ user data records at least one $k^{th}$ entity of the entities on the $k^{th}$ hierarchy level $L\_k$; clustering the $k^{th}$ user data; and recommending the entities in the ontology database to the users according to the clustering result.

Another aspect of the present invention is directed to a recommendation system. In accordance with one embodiment of the present invention, the recommendation system includes a storage module, a converting module, a clustering module and a recommendation module. The storage module is configured to store an ontology database. The ontology database includes a plurality of entities. The entities are arranged in an ontology hierarchy structure with N hierarchy levels $\{L\_i\}$, $i=1, 2, \ldots, N$, and N is an integer. The ontology database is configured to store a plurality of $j^{th}$ user data respectively corresponding to a plurality of users, and each of the $j^{th}$ user data records at least one $j^{th}$ entity of the entities on the $j^{th}$ hierarchy level $L\_j$. The converting module is configured to generate a plurality of $k^{th}$ user data corresponding to the users according to the $j^{th}$ user data respectively. Each of the $k^{th}$ user data records at least one $k^{th}$ entity of the entities on the $k^{th}$ hierarchy level $L\_k$. The clustering module is configured to cluster the $k^{th}$ user data. The recommendation module is configured to recommend the entities in the ontology database to the users according to the clustering result.

Thus, through application of one of the embodiments mentioned above, by arranging the entities in the ontology database with the ontology hierarchy structure, the user data recording the entities on one hierarchy level can be hierarchically converted to different user data which records the entities on different hierarchy level and which has different sparsity. Through such operation, the problem caused by the sparsity of the user data in traditional recommendation system can be solved, and the clustering result of the recommendation can be more accurate.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
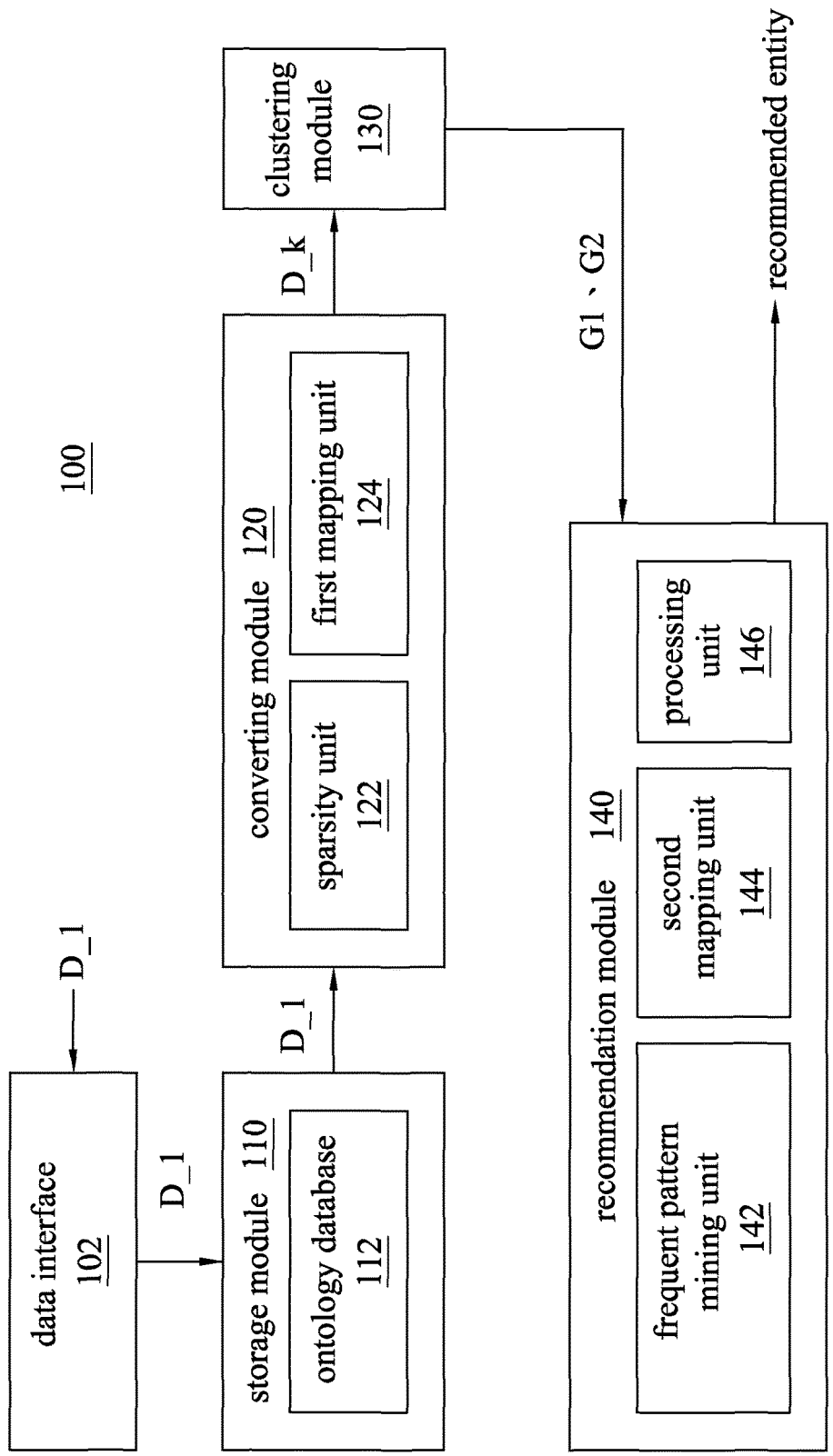
FIG. 1 is a schematic diagram of a recommendation system in accordance with one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that direction phrases, such as above, below, left, right, front or back, are only directions with reference to the accompanying drawings. Therefore, the direction phrases are used for illustration instead of limiting the invention.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

One aspect of the present disclosure is a recommendation system. To facilitate the description to follow, the recommendation system configured to recommend product is taken as a descriptive example in the following paragraphs. However, in practice, the recommendation system can be configured to recommend a substantial entity or an abstract entity, such as a scenery, a website, an information entry, and so on. The present disclosure is not limited to the embodiment below.

FIG. 1 is a schematic diagram of a recommendation system 100 in accordance with one embodiment of the present disclosure. The recommendation system 100 includes a data interface 102, a storage module 110, a converting module 120, a clustering module 130, and a recommendation module 140. The data interface 102 is electrically connected to the storage module 110. The storage module 110 is electrically connected to the clustering module 130. The recommendation module 140 is electrically connected to the clustering module 130. It should be noted that the connection between the components in the recommendation system 100 is for illustrative purposes only, and any connection configuration enabling the recommendation system 100 to practice the technical features described below can be used herein.

In this embodiment, the recommendation system 100, for example, can be realized by a computer system, but is not limited in this regard. The data interface 102, for example, can be realized by a keyboard, a mouse, or a network card, but is not limited in this regard. The storage module 110, for example, can be realized by a read-only memory, a flash memory, a floppy disc, a hard disc, an optical disc, a flash disc, a tape, an database accessible from a network, or any storage medium with the same functionality that can be contemplated by persons of ordinary skill in the art to which this invention pertains, but is not limited in this regard. The converting module 120, the clustering module 130, and the recommendation module 140, for example, can be realized by any type of processing device, such as one or more central processor or microprocessor, but are not limited in this regard.

In this embodiment, the recommendation system 100 is configured to store a plurality of user data (e.g., $1^{st}$ user data D_1 as shown in FIG. 1) corresponding to a plurality of users, and cluster the users according to the user data, so as to recommend the entities, such as products, to the users according to the clustering result (e.g., according to clusters G1, G2 as shown in FIG. 1).

Figure 2:
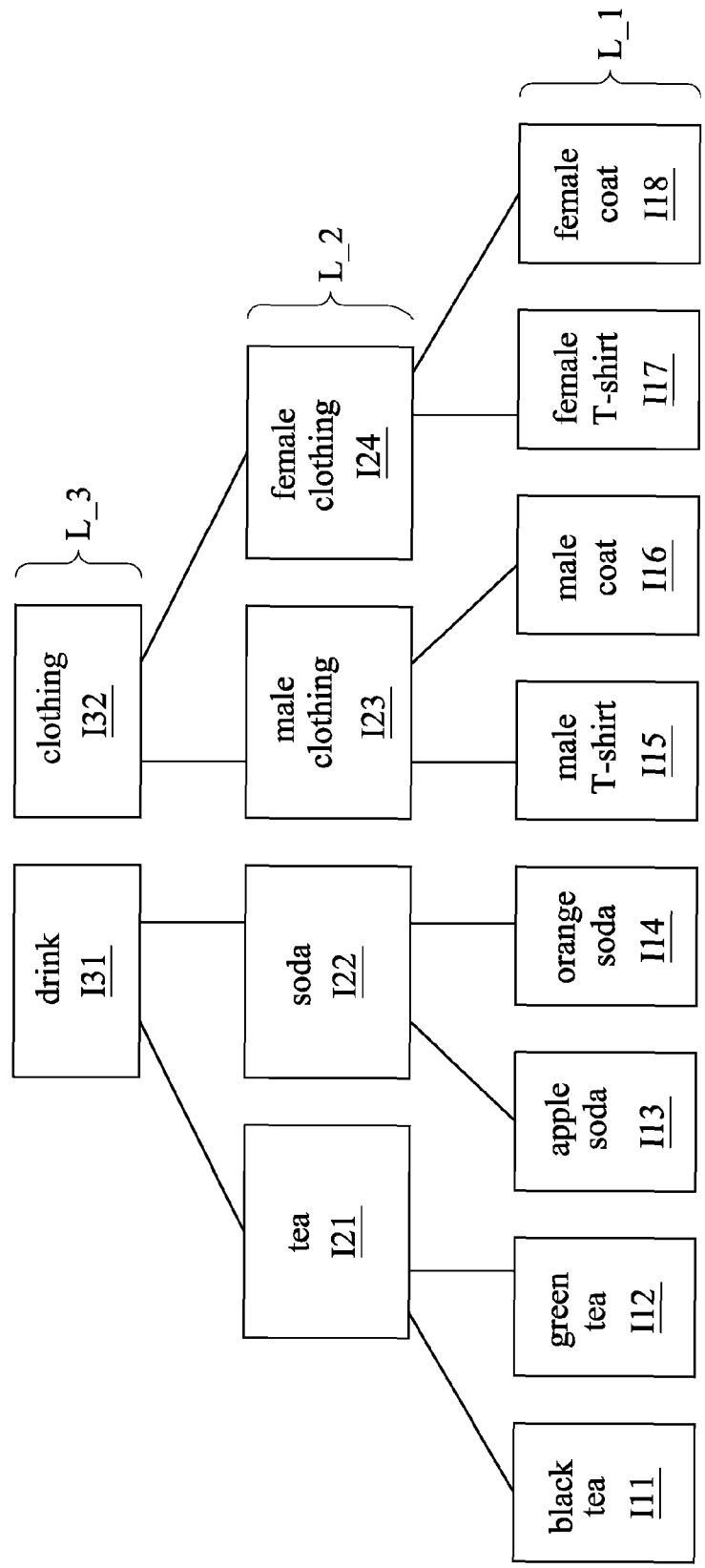
FIG. 2 is a diagram illustrating an ontology hierarchy structure in accordance with one embodiment of the present disclosure.

Reference is also made to FIG. 2, in this embodiment, the storage module 110 includes an ontology database 112. The ontology database includes a plurality of entities I11-I32. The entities I11-I32 are arranged in an ontology hierarchy structure (e.g., as shown in FIG. 2) with N hierarchy levels $\{L\_i\}$, i=1, 2, . . . , N, and N is an integer. In this embodiment, N is 3, and the N hierarchy levels $\{L\_i\}$ are referred to as a $1^{st}$ hierarchy level L_1, a $2^{nd}$ hierarchy level L_2, and a $3^{rd}$ hierarchy level L_3. In this embodiment the entities I11-I18 on the $1^{st}$ hierarchy level L_1 are, for example, products, and the entities I21-I32 on the $2^{nd}$ hierarchy level L_2 and the $3^{rd}$ hierarchy level L_3 are, for example, product categories. An entity on a relatively lower hierarchy level corresponds to at least one entity on a relatively higher hierarchy level. For example, the products black tea I11 and green tea I12 on the $1^{st}$ hierarchy level L_1 correspond to the category tea I21 on the $2^{nd}$ hierarchy level L_2, the products apple soda I13 and orange soda I14 on the $1^{st}$ hierarchy level L_1 correspond to the category soda I22 on the $2^{nd}$ hierarchy level L_2, and the categories tea I21 and soda I22 on the $2^{nd}$ hierarchy level correspond to the category drink I31 on the $3^{rd}$ hierarchy level L_3. In addition, an entity on a relatively lower hierarchy level is a subordinate entity of a corresponding entity on a relatively higher hierarchy level. For example, the products black tea I11 and green tea I12 on the $1^{st}$ hierarchy level L_1 are subordinate entities of the category tea I21 on the $2^{nd}$ hierarchy level L_2.

In another aspect of view, an entity on a relatively higher hierarchy level corresponds to a plurality of entities on a relatively lower hierarchy level. For example, the category drink I31 on the $3^{rd}$ hierarchy level L_3 corresponds to the categories tea I21 and soda I22 on the $2^{nd}$ hierarchy level. In addition, an entity on a relatively higher hierarchy level is a superordinate entity of a corresponding entity on a relatively lower hierarchy level. For example, the category drink I31 on the $3^{rd}$ hierarchy level L_3 is a superordinate entity of the categories tea I21 and soda I22 on the $2^{nd}$ hierarchy level.

In one embodiment, the entities I11-I32 in the ontology database 112, the hierarchy levels L_1-L_3, and the ontology hierarchy structure are configured according to, for example, products and categories of a store, but the entities I11-I32, the hierarchy levels L_1-L_3, and the ontology hierarchy structure are only for illustrative purpose, the invention is not limited in this regard.

In one embodiment, the data interface 102 of the recommendation system 100 is configured to receive a plurality of $1^{st}$ user data D1 respectively corresponding to a plurality of users, and provide the $1^{st}$ user data D1 to the ontology database 112. Each of the $1^{st}$ user data records at least one $1^{st}$ entity of the entities I11-I18 on the $1^{st}$ hierarchy level L_1 in the ontology database 112. For example, each of the $1^{st}$ user data records products have been purchased or websites have been visited by a corresponding user. In one embodiment, the $1^{st}$ user data can be presented in a matrix form, in which the quantity of the user is U, the quantity of the entities on the $1^{st}$ hierarchy level L_1 is I_1, and a degree of the matrix corresponding to the $1^{st}$ user data D1 is U xI_1.

In an idea condition, since a sparsity degree of the $1^{st}$ user data D1 is low (i.e., the $1^{st}$ user data D1 have a high density) (e.g., each user has purchased a large number of products or visited a large number of websites), the recommendation system 100 can accurately cluster the $1^{st}$ user data D1, so as to cluster the users with similar behaviors into one cluster, such that the recommendation can be performed according to the clustering result.

However, in a common condition, since the sparsity degree of the $1^{st}$ user data D1 is high (i.e., the $1^{st}$ user data D1 have a low density), the recommendation system 100 can not accurately cluster the users with similar behaviors into one cluster.

Thus, to overcome such a sparsity problem, the recommendation system 100 converts the $1^{st}$ user data D1 to, for example, a plurality of $k^{th}$ user data D_k recording the entities on the relatively higher hierarchy level (e.g., a $k^{th}$ hierarchy level L_k) according to the ontology hierarchy structure. Since the $k^{th}$ user data D_k have lower sparsity degree (have higher density), the recommendation system 100 can cluster the users more accurately.

In one embodiment, the converting module 120 in the recommendation system 100 is configured to generate the $k^{th}$ user data corresponding to the users according to the $1^{st}$ user data respectively. Each of the $k^{th}$ user data records at least one $k^{th}$ entity of the entities on a $k^{th}$ hierarchy level L_k in the ontology database 112. For example, when k is 3, the converting module 120 generates the $3^{rd}$ user data D_3 recording the category (e.g., drink I31 and/or clothing I32) according to the $1^{st}$ user data D_1 recording the substantial products (e.g., black tea I11, green tea I12, and so on). In one embodiment, the sparsity of the $k^{th}$ user data D_k is not greater than a $k^{th}$ threshold.

The clustering module 130 is configured to cluster the $k^{th}$ user data D_k into at least one cluster (e.g., the clusters G1, G2).

The recommendation module 140 in the recommendation system 100 is configured to recommend the entities I11-I32 in the ontology database 112 to the users according to the clustering result (e.g., the clusters G1, G2) from the cluster module 130.

To facilitate the description to follow, in the following paragraphs, an operative example is provided with reference to FIG. 1-FIG. 3. However, the application is not limited to the embodiment below.

Figure 3:
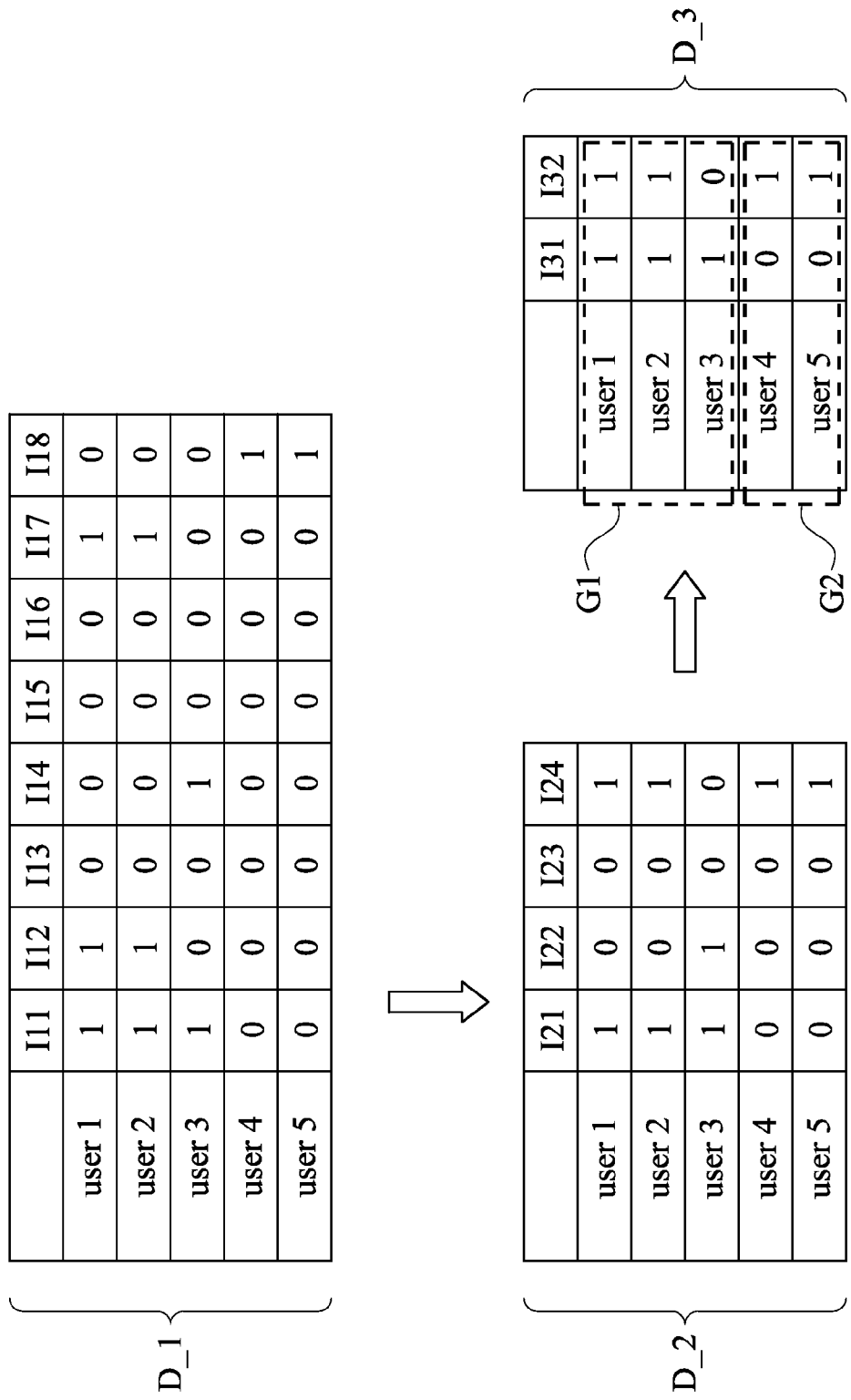
FIG. 3 is a diagram illustrating an operative example of the present disclosure.

In the operative example, in a case that the ontology database 112 store the $1^{st}$ user data D_1 as shown in FIG. 3, the converting module 120 calculates the sparsity of the $1^{st}$ user data D_1 and determines whether the sparsity of the $1^{st}$ user data D_1 is greater than a $1^{st}$ threshold. The $1^{st}$ user data D_1, for example, records states of purchasing of users from user 1 to user 5 corresponding to the entities (the products) I11-I18. The grid with value "1" indicates the product has been purchased, and the grid with value "0" indicates the product has not been purchased yet. For example, in the $1^{st}$ user data D_1, user 1 is recorded as having purchased the products black tea I11, green tea I12, and female T-shirt I17.

In a case that the sparsity of the $1^{st}$ user data D_1 is greater than the $1^{st}$ threshold, the converting module 120 is configured to map the $1^{st}$ entities recorded by the $1^{st}$ user data D_1 to the corresponding entities on the $2^{nd}$ hierarchy level L_2, to generate the $2^{nd}$ user data D_2. The $2^{nd}$ user data D_2, for example, records states of purchasing of the users from user 1 to user 5 corresponding to the entities (the categories) I21-I24. For example, in the $2^{nd}$ user data D_2, user 1 is recorded as having purchased products in the category tea I21 and female clothing I24. That is, the converting module 120 maps the products black tea I11, green tea I12, and female T-shirt I17 on the $1^{st}$ hierarchy level L_1 to the categories tea I21 and female clothing I24 on the $2^{nd}$ hierarchy level L_2.

Subsequently, the converting module 120 calculates the sparsity of the $2^{nd}$ user data D_2 and determines whether the sparsity of the $2^{nd}$ user data D_2 is greater than a $2^{nd}$ threshold, in which the $2^{nd}$ threshold may be the same as or different from the $1^{st}$ threshold. In a case that the sparsity of the $2^{nd}$ user data D_2 is greater than the $2^{nd}$ threshold, the converting module 120 is configured to map the $2^{nd}$ entities recorded by the $2^{nd}$ user data D_2 to the corresponding entities on the $3^{rd}$ hierarchy level L_3, to generate the $3^{rd}$ user data D_3. The $3^{rd}$ user data D_3, for example, records purchase states of the users from user 1 to user 5 corresponding to the entities (the categories) I31-I32. For example, in the $3^{rd}$ user data D_3, user 1 is recorded as having purchased products in the category drink I31 and clothing I32. That is, the converting module 120 maps the products tea I21 and female clothing I24 on the $2^{nd}$ hierarchy level L_2 to the category drink I31 and clothing I32 on the $3^{rd}$ hierarchy level L_3.

Subsequently, the converting module 120 calculates the sparsity of the $3^{rd}$ user data D_3 and determines whether the sparsity of the $3^{rd}$ user data D_3 is greater than a $3^{rd}$ threshold, in which the $3^{rd}$ threshold may be the same as or different from the $1^{st}$ threshold and/or the $2^{nd}$ threshold. In a case that the sparsity of the $3^{rd}$ user data D_3 is not greater than the $3^{rd}$ threshold, the $3^{rd}$ user data D_3 are the $k^{th}$ user data required.

In short, the converting module 120 converts the $1^{st}$ entities recorded by the $1^{st}$ user data D_1 to the entities on the $k^{th}$ hierarchy level L_k level by level according to the sparsity of the $1^{st}$ user data D_1, the sparsity of the $2^{nd}$ user data D_2, and the sparsity of the $3^{rd}$ user data D_3, and the mapped entities on the $k^{th}$ hierarchy level L_k are served as the $k^{th}$ entity recorded in each of the $k^{th}$ user data D_k.

After the $k^{th}$ user data D_k are generated, the clustering module 130 clusters the $k^{th}$ user data D_k according to the similarity between the $k^{th}$ user data D_k with a clustering algorithm. In this operative example, the users from user 1 to user 3 are clustered to the cluster G1, and the users from user 4 to user 5 are clustered to the cluster G2.

After the $k^{th}$ user data D_k are clustered, the recommendation module 140 recommends the entities I11-I32 in the ontology database 112 to the users from user 1 to user 5 according to the $k^{th}$ user data D_k in the clusters G1 and G2.

Through application of one of the embodiments mentioned above, the sparsity problem in a traditional recommendation system can be solved by clustering the $k^{th}$ user data D_k having lower sparsity degree (i.e., having higher density), such that the clustering result and the recommendation can be more accurate.

Moreover, via one embodiment of the operation above, the $k^{th}$ user data D_k can be generated according to the sparsity of the user data corresponding to each hierarchy levels {L_i}, such that the clustering mechanism can be more flexible.

In one embodiment of the invention, when a sparsity of the $x^{th}$ user data D_x is S_x (x is a positive integer, and the value of x is depended on which of the user data are calculated), a quantity of the users is U, a quantity of the entities on the $x^{th}$ hierarchy level L_x is I_x, a quantity of a sum of the $x^{th}$ entity recorded by each of the $x^{th}$ user data D_x is R_x, S_x, U, I_x, and R_x satisfy the following equations:

$$S\_x=1-(R\_x/(U\times I\_x)).$$

In addition, in one embodiment of the invention, the converting module 120, for example, includes a sparsity unit 122 and a first mapping unit 124. The sparsity unit 122 is configured to calculate the sparsity of the $x^{th}$ user data D_x and determine whether the sparsity of the $x^{th}$ user data D_x is greater than an $x^{th}$ threshold. In a case that the sparsity of the $x^{th}$ user data D_x is greater than the $x^{th}$ threshold, the first mapping unit 124 is configured to map at least one $x^{th}$ entities recorded in each $x^{th}$ user data D_x to at least one corresponding entity on the x+1 hierarchy level L_x+1. On the other hand, in a case that the sparsity of the $x^{th}$ user data D_x is not greater than the $x^{th}$ threshold, the first mapping unit 124 is configured to serve the $x^{th}$ user data D_x as the $k^{th}$ user data D_k.

In the following paragraphs, more details about the recommendation performed by the recommendation module 140 according to the clustered $k^{th}$ user data D_k are provided. However, the invention is not limited to the embodiment below.

In one embodiment, the recommendation module 140 is configured to search a $k^{th}$ frequent entity from the at least one $k^{th}$ entity recorded by each of the $k^{th}$ user data D_k in the cluster G1 or G2 through a frequent pattern mining algorithm. In one embodiment, the frequent pattern mining algorithm can be the apriori algorithm but not is limited in this particular algorithm. Subsequently, the recommendation module 140 is configured to searching a $1^{st}$ frequent entity from the entities on the $1^{st}$ hierarchy level L_1 according to the $k^{th}$ frequent entity. Next, the recommendation module 140 is configured to recommend the searched $1^{st}$ frequent entity to one of the users in the cluster G1 or cluster G2.

To facilitate the description to follow, in the following paragraphs, an operative example is provided with reference to FIGS. 1, 2, and 4. However, the application is not limited to the embodiment below.

Figure 4:
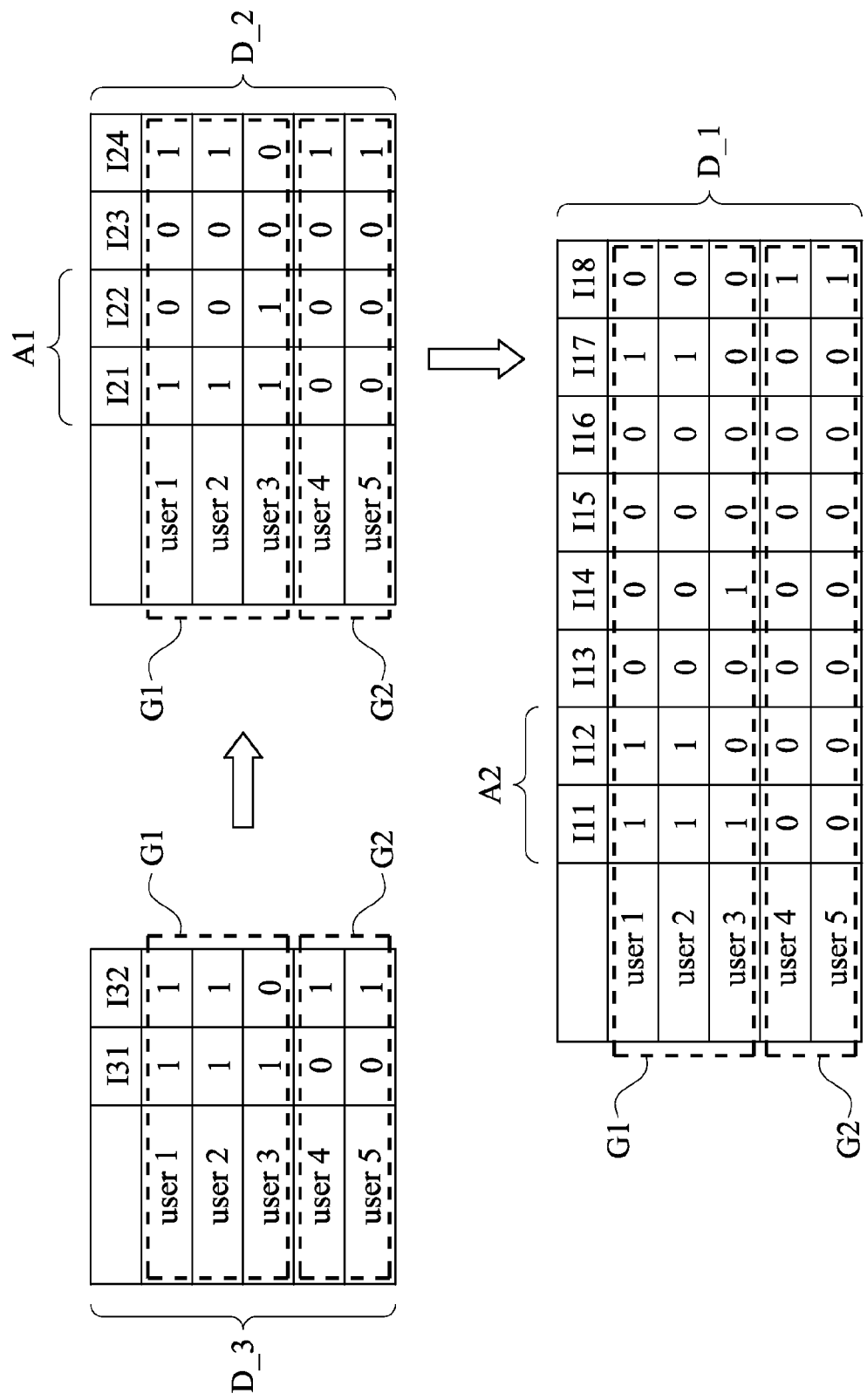
FIG. 4 is a diagram illustrating another operative example of the present disclosure.

In this operative example, after the converting module 120 generates the $3^{rd}$ user data D_3 as shown in FIG. 4 and the clustering module 130 clusters the $3^{rd}$ user data D_3 into the clusters G1, G2 as shown in FIG. 4, the recommendation module 140 searches a $3^{rd}$ frequency entity from the $3^{rd}$ user data D_3 in the cluster G1 through the frequent pattern mining algorithm. For illustrative, when the searched $3^{rd}$ frequency entity is entity I31, it indicates that the products in the category drink I31 has been frequently purchased by the users in the cluster G1.

At this time, the recommendation module 140 determines whether the $3^{rd}$ frequency entity is one of the entities I11-I18 on the $1^{st}$ hierarchy level L_1. Due to the fact that the $3^{rd}$ frequency entity is not one of the entities I11-I18 on the $1^{st}$ hierarchy level L_1, the recommendation module 140 maps the $3^{rd}$ frequency entity (e.g., the entity I31) to the corresponding entities on the $2^{nd}$ hierarchy level L_2, such as the entities I21, I22 indicated by the mark A1.

Subsequently, the recommendation module 140 searches a $2^{nd}$ frequency entity from the entities on the $2^{nd}$ hierarchy level L_2 corresponding to the $3^{rd}$ frequency entity (e.g., the entities I21, I22) through the frequent pattern mining algorithm. For illustrative, when the searched $2^{nd}$ frequency entity is entity I21, it indicates that the products in the category black tea I21 has been frequently purchased by the users in the cluster G1.

At this time, the recommendation module 140 determines whether the $2^{nd}$ frequency entity is one of the entities I11-I18 on the $1^{st}$ hierarchy level L_1. Due to the fact that the $2^{nd}$ frequency entity is not one of the entities I11-I18 on the $1^{st}$ hierarchy level L_1, the recommendation module 140 maps the $2^{nd}$ frequency entity (e.g., the entity I21) to the corresponding entities on the $1^{st}$ hierarchy level L_1, such as the entities I11, I12 indicated by the mark A2.

Subsequently, the recommendation module 140 searches a $1^{st}$ frequency entity from the entities on the $1^{st}$ hierarchy level L_1 corresponding to the $2^{nd}$ frequency entity (e.g., the entities I11, I12) through the frequent pattern mining algorithm. For illustrative, when the searched $1^{st}$ frequency entity is the entities I11, I12, it indicates that the products black tea I11 and green tea I12 have been frequently purchased by the users in the cluster G1.

At this time, the recommendation module 140 determines whether the $1^{st}$ frequency entity is one of the entities I11-I18 on the $1^{st}$ hierarchy level L_1. Due to the fact that the $1^{st}$ frequency entity is one of the entities I11-I18 on the $1^{st}$ hierarchy level L_1, the recommendation module 140 recommends the $1^{st}$ frequency entity to the users in the cluster G1.

In this operative example, the recommendation module 140 further configured to determine whether the $1^{st}$ user data corresponding to the users from user 1 to user 3 records the $1^{st}$ frequency entity. Subsequently, the recommendation module 140 is configured to selectively recommend the $1^{st}$ frequency entity to the users from user 1 to user 3 in the cluster G1 according to whether the $1^{st}$ user data corresponding to the users in the cluster G1 records the $1^{st}$ frequency entity. For example, since all of the users from user 1 to user 3 have purchased the product black tea I11, the recommendation module 140 does not recommend the product black tea I11 to the users from user 1 to user 3. On the other hand, since user 3 has not purchased the product green tea I12 yet, the recommendation module 140 recommends the product green tea I12 to user 3.

Through the embodiment above, the $1^{st}$ frequent entity can be searched according to the $k^{th}$ user data in the clusters G1, G2. Accordingly, the $k^{th}$ user data D_k generated by the converting module 120 recording the conceptualized categories can be back converted to the $1^{st}$ user data D_1 recording the actual products. Through performing recommendation according to the converted $1^{st}$ user data D_1 recording the actual products, the frequent entity corresponding to one of the clusters G1 and G2 can be accurately recommended to the users in the one of the clusters G1 and G2.

In one embodiment of the present invention, the recommendation module 140 includes a frequent pattern mining unit 142, a second mapping unit 144, and a processing unit 146. The frequent pattern mining unit 142 is configured to search an $x^{th}$ frequent entity from a part of or all of the entities on an $x^{th}$ hierarchy level L_x through a frequent pattern mining algorithm, in which x is a positive integer, and the value of x is depended on which of the hierarchy level is calculated. The second mapping unit 144 is configured to map the $x^{th}$ frequent entity to corresponding entities on the $x-1^{th}$ hierarchy level L_x-1. The processing unit 146 is configured to determine whether the $x^{th}$ frequent entity is one of the entities I11-I18 on the $1^{st}$ hierarchy level L_1, and recommend the $x^{th}$ frequent entity to the users in cluster G1 or cluster G2 in a case that the $x^{th}$ frequent entity is exactly one of the entities I11-I18 on the $1^{st}$ hierarchy level L_1.

By utilizing the frequent pattern mining unit 142, the second mapping unit 144, and the processing unit 146, the recommendation module 140 can search the $1^{st}$ frequent entity according to the $k^{th}$ user data in the cluster G1 or cluster G2, so as to perform the recommendation. It should be noted that the details of searching the $1^{st}$ frequent entity can be ascertained with reference to the paragraphs mentioned above, and it will not be repeated herein.

In addition, it should be noted that, in one embodiment, the recommendation system 100 can be realized by single device. In another embodiment, the recommendation system 100 can be realized by a server device and a remote device. The server device is configured to perform the conversion, the clustering, and the recommendation according to the $1^{st}$ user data, and provide recommended information (e.g., recommended entities) to the remote device.

Figure 5:
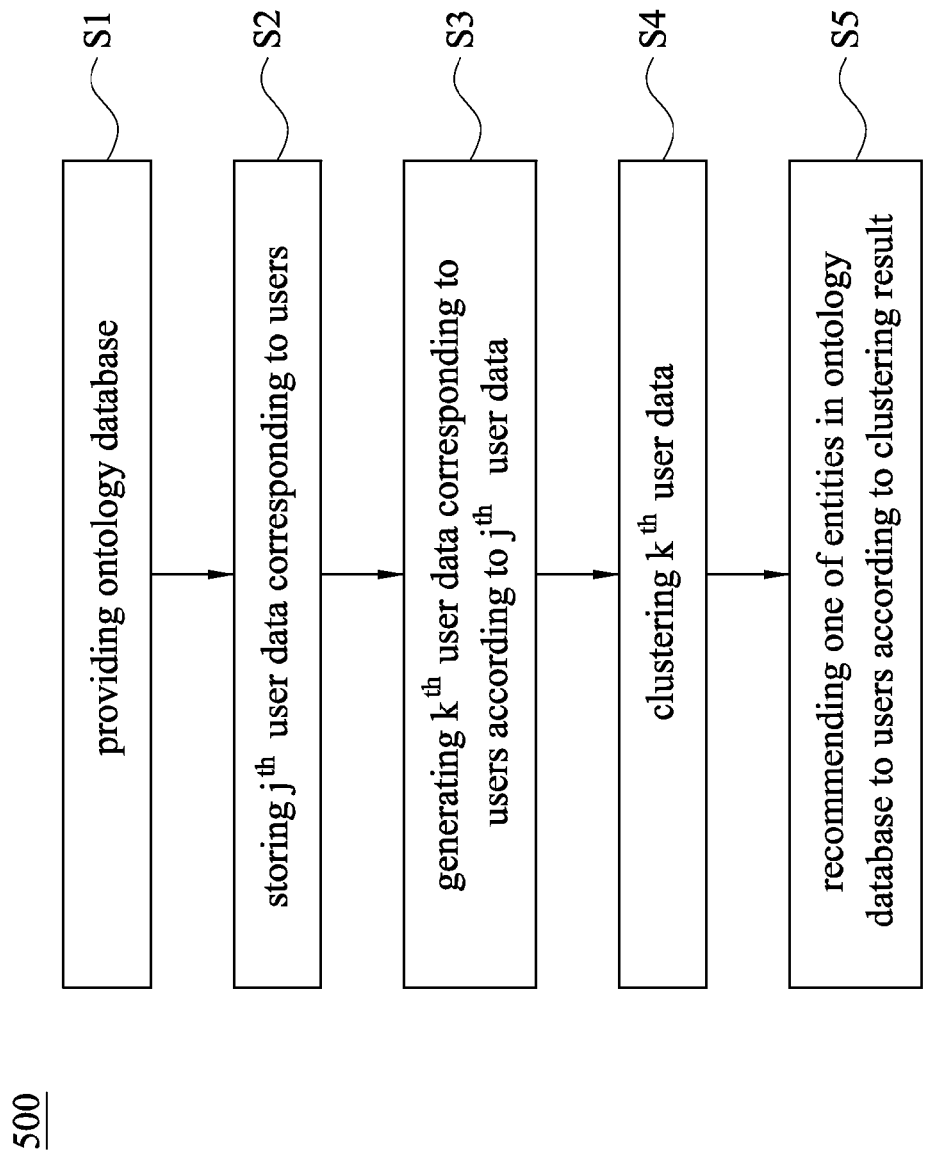
FIG. 5 is a flowchart illustrating a recommendation method in accordance with one embodiment of the present disclosure.

FIG. 5 is a flowchart illustrating a recommendation method 500 in accordance with one embodiment of the present disclosure. The recommendation method 500 can be used in the recommendation system 100 depicted in FIG. 1. More specifically, the recommendation method 500 can be implemented by using a computer program to control the modules in the recommendation system 100. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

In addition, it should be noted that, in the steps of the following recommendation method 500, no particular sequence is required unless otherwise specified. Moreover, the following steps also may be performed simultaneously or the execution times thereof may at least partially overlap.

In step S1, the storage module 110 provides the ontology database 112. The details of the ontology database 112 can be ascertained by referring to the paragraphs above, and a description in this regard will not be repeated herein.

In step S2, the ontology database 112 stores a plurality of $j^{th}$ user data respectively corresponding to a plurality of users. Each of the $j^{th}$ user data records at least one $j^{th}$ entity of the entities on the $j^{th}$ hierarchy level L_j. In this embodiment, the value of j, for example, is 1.

In step S3, the converting module 120 generates a plurality of $k^{th}$ user data corresponding to the users according to the $j^{th}$ user data respectively. Each of the $k^{th}$ user data records at least one $k^{th}$ entity of the entities on the $k^{th}$ hierarchy level L_k.

In one embodiment, the converting module 120 maps the $j^{th}$ entity recorded in each of the $j^{th}$ user data to at least one of the entities on the $k^{th}$ hierarchy level L_k level by level according to the ontology hierarchy structure, to serve the mapped entity on the $k^{th}$ hierarchy level L_k as the $k^{th}$ entity recorded in each of the $k^{th}$ user data, so as to generate the $k^{th}$ user data D_k.

In step S4, the clustering module 130 clusters the $k^{th}$ user data D_k. The clustering module 130 clusters the $k^{th}$ user data D_k, for example, through a common clustering algorithm.

In step S5, the recommendation module 140 recommends one of the entities I1-I32 in the ontology database to the users according to the clustering result (e.g., clusters G1, G2).

It should be noted that, the details of the recommendation method 500 can be ascertained by referring to the paragraphs mentioned above, and it would not be repeated herein.

Through application of one of the embodiments mentioned above, the sparsity problem in a traditional recommendation system can be solved by clustering the $k^{th}$ user data D_k having lower sparsity degree (i.e., having higher density), such that the clustering result and the recommendation can be more accurate.

Figure 6:
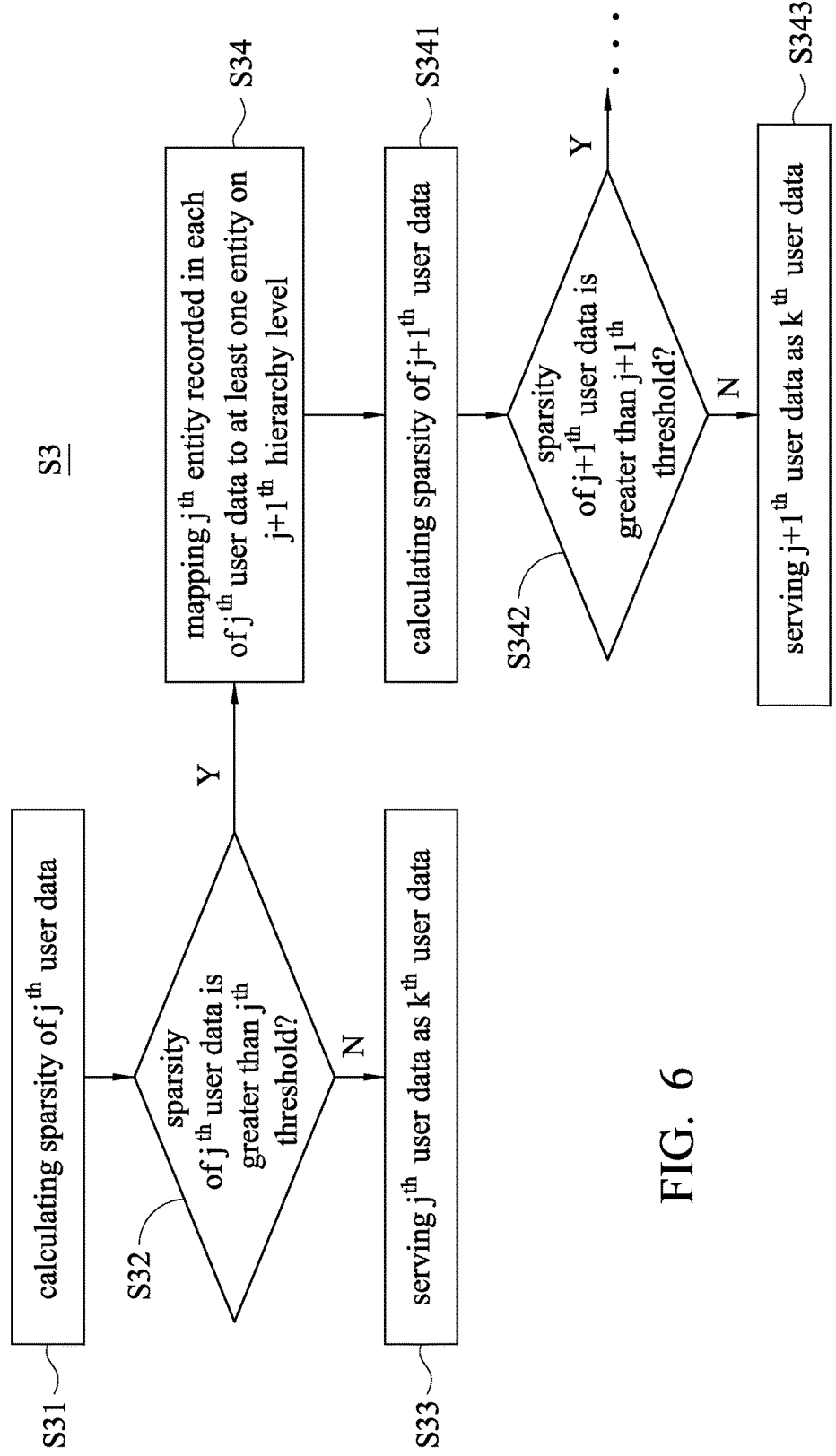
FIG. 6 is a flowchart illustrating sub-steps in one step of the recommendation method illustrated in FIG. 5 in accordance with one embodiment of the present disclosure.

FIG. 6 is a flowchart illustrating sub-steps in step S3 of the recommendation method illustrated in FIG. 5 in accordance with one embodiment of the present disclosure. Step S3 includes the sub-steps below.

In sub-step S31, the sparsity unit 122 calculates the sparsity of the $j^{th}$ user data D_j.

In sub-step S32, the sparsity unit 122 determines whether the sparsity of the $j^{th}$ user data D_j is greater than a $j^{th}$ threshold. If so, sub-step S34 is performed; if not, sub-step S33 is performed.

In sub-step S33, in a case that the sparsity of the $j^{th}$ user data D_j is not greater than the $j^{th}$ threshold, the first mapping unit 124 serves the $j^{th}$ user data as the $k^{th}$ user data used to be clustered in a later sub-step.

In sub-step S34, in a case that the sparsity of the $j^{th}$ user data D_j is greater than the $j^{th}$ threshold, the first mapping unit 124 maps the $j^{th}$ entity recorded in each of the $j^{th}$ user data D_j to the corresponding entity on the $j+1^{th}$ hierarchy level L_j+1, to generate the $j+1^{th}$ user data D_j+1.

In sub-step S341, the sparsity unit 122 calculates the sparsity of the $j+1^{th}$ user data D_j+1.

In sub-step S342, the sparsity unit 122 determines whether the sparsity of the $j+1^{th}$ user data D_j+1 is greater than a $j+1^{th}$ threshold, in which the $j+1^{th}$ threshold can be the same as or different from the $j^{th}$ threshold. If not, sub-step S343 is performed, and the $j+1^{th}$ user data D_j+1 are served as the $k^{th}$ user data D_k used to be clustered in step S4. If so, the first mapping unit 124 maps the $j+1^{th}$ entity recorded in each of the $j+1^{th}$ user data D_j+1 to the corresponding entity on the $j+2^{th}$ hierarchy level L_j+2 again, to generate the $j+2^{th}$ user data D_j+2, until an $x^{th}$ user data D_x are generated in which the sparsity of the $x^{th}$ user data D_x are not greater than an $x^{th}$ threshold (x is a positive integer, and the value of x is depended on which of the user data are calculated). The $x^{th}$ threshold can be the same as or different from the $j^{th}$ threshold and the $j+1^{th}$ threshold.

Through such operation, the $k^{th}$ user data D_k can be generated according to the sparsity of the user data corresponding to each hierarchy levels {L_i}, such that the clustering mechanism can be more flexible.

Figure 7:
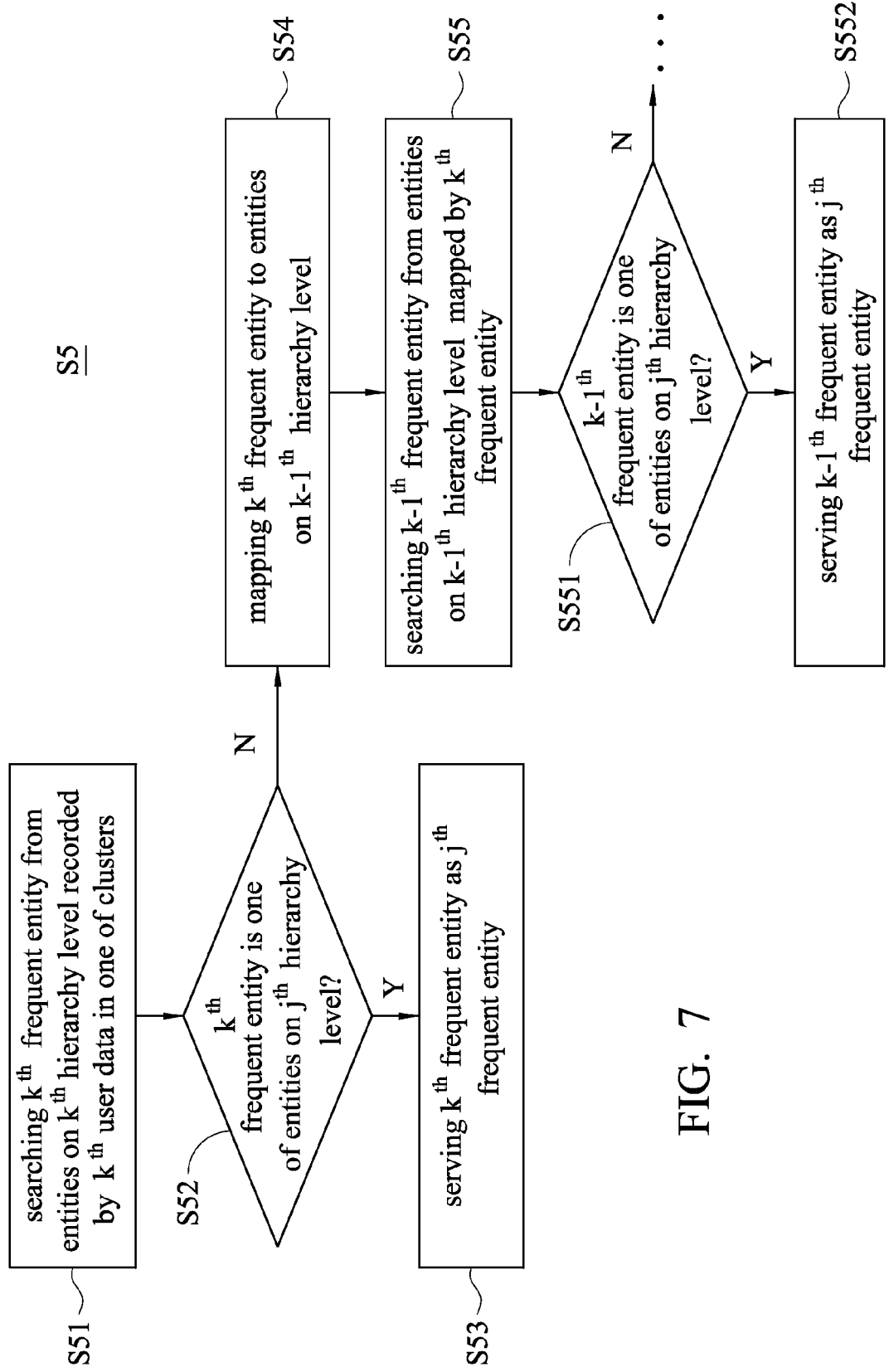
FIG. 7 is a flowchart illustrating sub-steps in another step of the recommendation method illustrated in FIG. 5 in accordance with one embodiment of the present disclosure.

FIG. 7 is a flowchart illustrating sub-steps in step S5 of the recommendation method illustrated in FIG. 5 in accordance with one embodiment of the present disclosure. Step S5 includes the sub-steps below.

In sub-step S51, the frequent pattern mining unit 142 searches a $k^{th}$ frequent entity from the entities on the $k^{th}$ hierarchy level L_k recorded by the $k^{th}$ user data D_k in one of the clusters G1, G2 through the frequent pattern mining algorithm.

In sub-step S52, the processing unit 146 determines whether the $k^{th}$ frequent entity is one of the entities on the $j^{th}$ hierarchy level L_j. If so, sub-step S53 is performed. If not, sub-step S54 is performed.

In sub-step S53, in a case that the $k^{th}$ frequent entity is one of the entities on the $j^{th}$ hierarchy level L_j, the processing unit 146 serves the $k^{th}$ frequent entity as a $j^{th}$ frequent entity, so as to provides the $j^{th}$ frequent entity to the users corresponding to the $k^{th}$ user data D_k in the one of the clusters G1, G2.

In sub-step S54, in a case that the $k^{th}$ frequent entity is not one of the entities on the $j^{th}$ hierarchy level L_j, the second mapping unit 144 maps the $k^{th}$ frequent entity to the entities on the $k-1^{th}$ hierarchy level L_k-1.

In sub-step S55, the frequent pattern mining unit 142 searches a $k-1^{th}$ frequent entity from the entities on the $k-1^{th}$ hierarchy level L_k-1 mapped by the $k^{th}$ frequent entity.

In sub-step S551, the processing unit 146 determines whether the $k-1^{th}$ frequent entity is one of the entities on the $j^{th}$ hierarchy level L_j. If so, sub-step S552 is performed, and the $k-1^{th}$ frequent entity is served as the $j^{th}$ frequent entity, so as to be provided to the users corresponding to the $k^{th}$ user data D_k in the one of the clusters G1, G2. If not, the second mapping unit 144 further maps the $k-1^{th}$ frequent entity to entities on the $k-2^{th}$ hierarchy level L_k-2, until the $j^{th}$ frequent entity on the $j^{th}$ hierarchy level L_j is searched.

Through the embodiment above, the $k^{th}$ user data D_k generated by the converting module 120 recording the conceptualized categories can be back converted to the $1^{st}$ user data D_1 recording the actual products. Through performing recommendation according to the converted $1^{st}$ user data D_1 recording the actual products, the frequent entity corresponding to one of the clusters G1 and G2 can be accurately recommended to the users in the one of the clusters G1 and G2.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A recommendation method comprising:
providing an ontology database comprising an ontology hierarchy structure with N hierarchy levels, wherein N is an integer, and each of the hierarchy levels comprises at least one entity;
storing, through the ontology database, a plurality of $j^{th}$ user data respectively corresponding to a plurality of users, wherein each of the $j^{th}$ user data records at least one $j^{th}$ entity of the entities on a $j^{th}$ hierarchy level of the ontology hierarchy structure;
generating a plurality of $k^{th}$ user data corresponding to the users according to the $j^{th}$ user data respectively, wherein each of the $k^{th}$ user data records at least one $k^{th}$ entity of the entities on a $k^{th}$ hierarchy level of the ontology hierarchy structure;
clustering the $k^{th}$ user data; and
recommending the entities in the ontology database to the users according to the clustering result,
wherein the step of generating the $k^{th}$ user data corresponding to the users comprises:
calculating a sparsity of the $j^{th}$ user data; and
mapping the $j^{th}$ entity recorded in each of the $j^{th}$ user data to at least one of the $k^{th}$ entity recorded in each of the $k^{th}$ user data according to the sparsity of the $j^{th}$ user data;
wherein a first calculating value is equal to a product of a quantity of the users and a quantity of the entities on the $j^{th}$ hierarchy level, a second calculating value is equal to a quantity of a sum of the $j^{th}$ entity recorded by each of the $j^{th}$ user data divided by the first calculating value, and the sparsity of the $j^{th}$ user data is equal to 1 subtracted by the second calculating value.

2. The recommendation method as claimed in claim 1, wherein the step of generating the $k^{th}$ user data corresponding to the users comprises:
mapping the $j^{th}$ entity recorded in each of the $j^{th}$ user data to at least one of the entities on the $k^{th}$ hierarchy level according to the ontology hierarchy structure, to serve as the $k^{th}$ entity recorded in each of the $k^{th}$ user data.

3. The recommendation method as claimed in claim 1, wherein the step of mapping the $j^{th}$ entity recorded in each of the $j^{th}$ user data to at least one of the $k^{th}$ entity recorded in each of the $k^{th}$ user data comprises:
determining whether the sparsity of the $j^{th}$ user data is greater than a $j^{th}$ threshold; and
mapping the $j^{th}$ entity recorded in each of the $j^{th}$ user data to at least one of the $k^{th}$ entity recorded in each of the $k^{th}$ user data in a case that the sparsity of the $j^{th}$ user data is greater than the $j^{th}$ threshold.

4. The recommendation method as claimed in claim 3, wherein the step of mapping the $j^{th}$ entity recorded in each of the $j^{th}$ user data to at least one of the $k^{th}$ entity recorded in each of the $k^{th}$ user data further comprises:
serving the $j^{th}$ user data as the $k^{th}$ user data in a case that the sparsity of the $j^{th}$ user data is not greater than the $j^{th}$ threshold.

5. The recommendation method as claimed in claim 1, wherein the step of recommending the entities in the ontology database to the users according to the clustering result comprises:
searching a $k^{th}$ frequent entity from the $k^{th}$ entity recorded by each of the $k^{th}$ user data in a cluster;
searching a $j^{th}$ frequent entity from the entities on the $j^{th}$ hierarchy level according to the $k^{th}$ frequent entity; and
recommending the $j^{th}$ frequent entity to one of the users corresponding to the $k^{th}$ user data in the cluster.

6. The recommendation method as claimed in claim 5, wherein the step of searching the $j^{th}$ frequent entity from the entities on the $j^{th}$ hierarchy level according to the $k^{th}$ frequent entity comprises:
determining whether the $k^{th}$ frequent entity is one of the entities on the $j^{th}$ hierarchy level;
mapping the $k^{th}$ frequent entity to corresponding entities of the entities on a $k-1^{th}$ hierarchy level of the ontology hierarchy structure in a case that the $k^{th}$ frequent entity is not one of the entities on the $j^{th}$ hierarchy level; and
searching, through a frequent pattern mining algorithm, a $k-1^{th}$ frequent entity from the corresponding entities on the $k-1^{th}$ hierarchy level mapped by the $k^{th}$ frequent entity.

7. The recommendation method as claimed in claim 6, wherein the step of searching the $j^{th}$ frequent entity from the entities on the $j^{th}$ hierarchy level according to the $k^{th}$ frequent entity further comprises:
serving the $k^{th}$ frequent entity as the $j^{th}$ frequent entity in a case that the $k^{th}$ frequent entity is one of the entities on the $j^{th}$ hierarchy level.

8. A recommendation system comprising:
a storage module configured to store an ontology database comprising an ontology hierarchy structure with N hierarchy levels, N is an integer, each of the hierarchy levels comprises at least one entity, the ontology database is configured to store a plurality of $j^{th}$ user data respectively corresponding to a plurality of users, and each of the $j^{th}$ data records at least one $j^{th}$ entity of the entities on a $j^{th}$ hierarchy level of the ontology hierarchy structure;
a converting module configured to generate a plurality of $k^{th}$ user data corresponding to the users according to the j data respectively, wherein each of the $k^{th}$ user data records at least one $k^{th}$ entity of the entities on a $k^{th}$ hierarchy level of the ontology hierarchy structure;
a clustering module configured to cluster the $k^{th}$ user data; and
a recommendation module configured to recommend the entities in the ontology database to the users according to the clustering result;

wherein the converting module is configured to calculate a sparsity of the $j^{th}$ user data, and map the $j^{th}$ entity recorded in each of the $j^{th}$ user data to at least one of the $k^{th}$ entity recorded in each of the $k^{th}$ user data according to the sparsity of the $j^{th}$ user data;

wherein a first calculating value is equal to a product of a quantity of the users and a quantity of the entities on the $j^{th}$ hierarchy level, a second calculating value is equal to a quantity of a sum of the $j^{th}$ entity recorded by each of the $j^{th}$ user data divided by the first calculating value, and the sparsity of the $j^{th}$ user data is equal to 1 subtracted by the second calculating value.

9. The recommendation system as claimed in claim 8, wherein the converting module is configured to map the $j^{th}$ entity recorded in each of the $j^{th}$ user data to at least one of the entities on the $k^{th}$ hierarchy level according to the ontology hierarchy structure, to serve as the $k^{th}$ entity recorded in each of the $k^{th}$ user data.

10. The recommendation system as claimed in claim 8, wherein the converting module is configured to determine whether the sparsity of the $j^{th}$ user data is greater than a $j^{th}$ threshold, and map the $j^{th}$ entity recorded in each of the $j^{th}$ user data to at least one of the $k^{th}$ entity recorded in each of the $k^{th}$ user data in a case that the sparsity of the $j^{th}$ user data is greater than the $j^{th}$ threshold.

11. The recommendation system as claimed in claim 10, wherein the converting module is configured to serve the $j^{th}$ user data as the $k^{th}$ user data in a case that the sparsity of the $j^{th}$ user data is not greater than the $j^{th}$ threshold.

12. The recommendation system as claimed in claim 8, wherein the recommendation module is configured to search a $k^{th}$ frequent entity from the $k^{th}$ entity recorded by each of the $k^{th}$ user data in a cluster, search a $j^{th}$ frequent entity from the entities on the $j^{th}$ hierarchy level according to the $k^{th}$ frequent entity, and recommend the $j^{th}$ frequent entity to one of the users corresponding to the $k^{th}$ user data in the one of the cluster.

13. The recommendation system as claimed in claim 12, wherein the recommendation module is configured to determine whether the $k^{th}$ frequent entity is one of the entities on the $j^{th}$ hierarchy level, map the $k^{th}$ frequent entity to corresponding entities of the entities on a $k-1^{th}$ hierarchy level of the ontology hierarchy structure in a case that the $k^{th}$ frequent entity is not one of the entities on the $j^{th}$ hierarchy level, and search, through a frequent pattern mining algorithm, a $k-1^{th}$ frequent entity from the corresponding entities on the $k-1^{th}$ hierarchy level mapped by the $k^{th}$ frequent entity.

14. The recommendation system as claimed in claim 13, wherein the recommendation module is configured to serve the $k^{th}$ frequent entity as the $j^{th}$ frequent entity in a case that the $k^{th}$ frequent entity is one of the entities on the $j^{th}$ hierarchy level.

15. A non-transitory computer readable storage medium for storing a computer program configured to execute a recommendation method applied to a recommendation system, wherein the recommendation method comprises:

providing an ontology database, wherein the ontology database comprises a plurality of entities, the entities are arranged in an ontology hierarchy structure with N hierarchy levels, and N is an integer;

storing, through the ontology database, a plurality of $j^{th}$ user data respectively corresponding to a plurality of users, wherein each of the $j^{th}$ user data records at least one $j^{th}$ entity of the entities on the $j^{th}$ hierarchy level;

generating a plurality of $k^{th}$ user data corresponding to the users according to the $j^{th}$ user data respectively, wherein each of the $k^{th}$ user data records at least one $k^{th}$ entity of the entities on a $k^{th}$ hierarchy level of the ontology hierarchy structure;

clustering the $k^{th}$ user data; and recommending the entities in the ontology database to the users according to the clustering result;

wherein the step of generating the $k^{th}$ user data corresponding to the users comprises:

calculating a sparsity of the $j^{th}$ user data; and mapping the $j^{th}$ entity recorded in each of the $j^{th}$ user data to at least one of the $k^{th}$ entity recorded in each of the $k^{th}$ user data according to the sparsity of the $j^{th}$ user data;

wherein a first calculating value is equal to a product of a quantity of the users and a quantity of the entities on the $j^{th}$ hierarchy level, a second calculating value is equal to a quantity of a sum of the $j^{th}$ entity recorded by each of the $j^{th}$ user data divided by the first calculating value, and the sparsity of the $j^{th}$ user data is equal to 1 subtracted by the second calculating value.

16. The non-transitory computer readable storage medium as claimed in claim 15, wherein the step of generating the $k^{th}$ user data corresponding to the users comprises:

mapping the $j^{th}$ entity recorded in each of the $j^{th}$ user data to at least one of the entities on the $k^{th}$ hierarchy level according to the ontology hierarchy structure, to serve as the $k^{th}$ entity recorded in each of the $k^{th}$ user data.

* * * * *